United States Patent
Peters et al.

[11] 3,720,693
[45] March 13, 1973

[54] ANTHRAQUINONE DYESTUFFS

[75] Inventors: Karl-Heinz Peters, Cologne; Rutger Neeff, Leverkusen, both of Germany

[73] Assignee: Bayer Aktiengesellschaft, Leverkusen, Germany

[22] Filed: Feb. 6, 1970

[21] Appl. No.: 9,401

[30] Foreign Application Priority Data

Feb. 15, 1969 Germany.....................P 19 07 783.9

[52] U.S. Cl. .................................260/377, 8/4, 8/5, 8/40, 260/29.2 R, 260/29.2 N, 260/29.2 E, 260/32.6 R, 260/32.6 A, 260/32.6 N, 260/32.6 PQ, 260/37 P, 260/37 NP, 260/40 P, 260/40 R, 260/41 C, 260/372

[51] Int. Cl. ............................C09b 1/42, C09b 1/50

[58] Field of Search................................260/377, 372

[56] References Cited

UNITED STATES PATENTS

| | | | |
|---|---|---|---|
| 2,420,453 | 5/1947 | Sutter et al. | 260/377 |
| 3,473,882 | 10/1969 | Weber et al. | 260/377 |
| 3,439,003 | 4/1969 | Reich et al. | 260/377 |
| 2,094,311 | 9/1937 | Utsinger et al. | 260/377 |

Primary Examiner—Lorraine A. Weinberger
Assistant Examiner—E. Jane Skelly
Attorney—Plumley & Tyner

[57] ABSTRACT

Anthraquinone dyestuffs of the formula

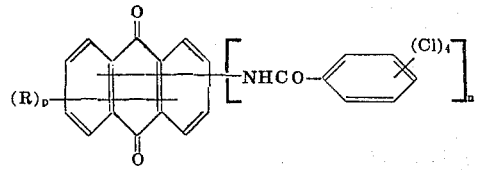

in which R is a substituent; $p$ is a number 0–6; and $n$ is 1 or 2; their production and use as pigments are disclosed.

5 Claims, No Drawings

ANTHRAQUINONE DYESTUFFS

The subject matter of the present invention relates to anthraquinone dyestuffs of the general formula

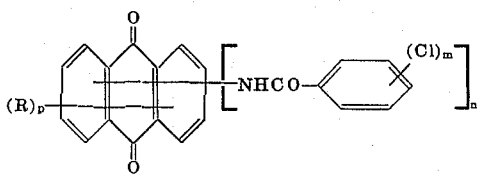

(I)

in which R stands for a substituent, $p$ denotes the numbers 0 – 6, $m$ the number 4, and $n$ represents the numbers 1 or 2, as well as to their production and use as pigments.

Suitable substituents R are, for example: halogen atoms, such as fluorine, chlorine or bromine; nitro groups, amino groups, alkylamino groups with one – 18 carbon atoms; cycloalkylamino groups; arylamino groups; alkylcarbonylamino groups with 1-18 carbon atoms; arylcarbonylamino groups, for example substituted or unsubstituted benzoyl- or naphthoyl-amino groups; hydroxy groups; alkoxy groups, especially those with one – three carbon atoms; alkyl or optionally substituted phenylmercapto groups; alkyl or optionally substituted phenyl-sulphonyl groups; carboxy groups; carbalkoxy groups, optionally substituted carbamoyl groups; acyl groups; optionally substituted sulphamoyl groups, or optionally substituted phenyl sulphonylamino groups.

Preferred dyestuffs are those of the formula

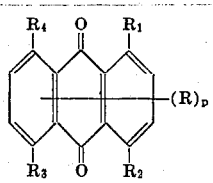

(II)

in which $R_1 - R_4$ stand for hydrogen or for a substituent, with the proviso that one or two of the radicals $R_1 - R_4$ stand for a radical

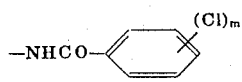

R, $m$ and $p$ having the same meaning as above.

Within the meaning of the dyestuffs of the formula (II) are those dyestuffs preferred in which two of the radicals $R_1 - R_4$ stand for the radical

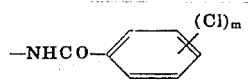

but especially those in which $R_1$ and $R_2$ stand for the radical

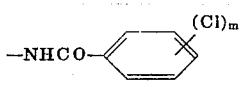

and R, $R_3$, $R_4$, $m$ and $p$ have the meaning given in formula (II), as well as those in which $R_1$ and $R_3$ stand for the radical

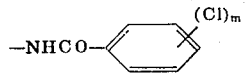

whereas $R_2$, $R_4$, R as well as $m$ and $p$ have the meaning given in formula (II).

Other preferred dyestuffs are those of the formula (II) in which $R_1 - R_4$ have the same meaning as above, and at least one of the radicals R or $R_1 - R_4$ stand for the group

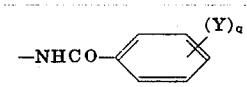

in which Y represents a substituent and $q$ stands for the numbers 0 – 5.

Suitable substituents Y are in this connection those indicated for R. Preferred substitutents Y are halogen, such as F, Cl, Br; $NO_2$; alkyl groups with one – four carbon atoms; trifluoromethyl groups; carboxyl groups; optionally substituted carbamoyl groups; hydroxy groups; alkoxy groups with one – four carbon atoms, as well as sulphamoyl groups.

Preferred dyestuffs within the meaning of the formula I are also quite generally those which are free from sulphonic acid groups.

The compounds according to the invention are produced according to known methods by acylating aminoanthraquinones of the formula

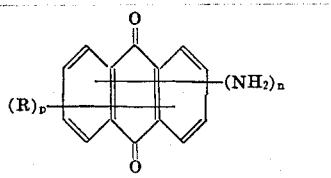

(III)

in which R stands for a substituent, $p$ represents the numbers 0 – 6, and $n$ stands for 1 or 2, with at least $n$ mol of a reactive derivative of a carboxylic acid of the formula

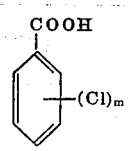

(IV)

in which $m$ stands for the number 4.

By a preferred method of carrying out the process 1 mol of an amine of the formula (III) is reacted with at least n mol of a carboxylic acid halide of the formula

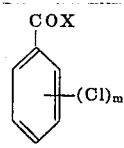

(V)

in which $m$ has the same meaning as above, and X represents halogen, such as fluorine, chlorine or bromine, at temperatures ranging from 40°C to 220°C, in an inert organic solvent, such as benzene, toluene, xylene, chlorobenzene, dichlorobenzene, trichlorobenzene, nitrobenzene, optionally in the presence of basic catalysts, such as pyridine, morpholine, trimethylamine, collidine, picoline, lutidine, quinoline, dimethyl-formamide, with or without the addition of acid-binding agents, such as sodium carbonate, potassium carbonate, sodium or potassium bicarbonate or quicklime, until the initial amine is completely consumed.

Suitable aminoanthraquinones of the formula (III) are the following, for example: 1-amino-anthraquinone, 2-amino-anthraquinone, 1,4-, 1,5-, 1,6-, 1,7-, 1,8- or 2,6-diamino-anthraquinone, 1,4,5,8-tetraaminoanthraquinone, 4-amino-1-methylamino-anthraquinone, 4-amino-1-butylamino-anthraquinone, 4-amino-1-dodecylamino-anthraquinone, 4-amino-1-octadecylamino-anthraquinone, 4-amino-1-cyclohexylamino-anthraquinone, 4-amino-1-anilino-anthraquinone, 4-amino-1-(4-chloro-anilino)-anthraquinone, 4-amino-1-(2,4-dichloroanilino)-anthraquinone, 4-amino-1-(4-methoxy-anilino-anthraquinone, 4-, 5-, 6- and 7-chloro-1-amino-anthraquinone, 6- or 7-fluoro-1-amino-anthraquinone, 5,8- or 6,7-dichloro-1-amino-anthraquinone, 6,7-difluoro-1-amino-anthraquinone, 4,5,8-trichloro-1-amino-anthraquinone, 5,8-dichloro-1,4-diamino-anthraquinone, 4-chloro-1,5-diamino-anthraquinone, 3-bromo-4-amino-1-(p-toluidino)-anthraquinone, 4- or 5-nitro-1-amino-anthraquinone, 5-nitro-1,4-diamino-anthraquinone, 4- or 5-amino-1-acetylamino-anthraquinone, — 5-amino-1-propionylamino-anthraquinone, 5-amino-1-butyrylamino-anthraquinone, 5-amino-1-laurylamino-anthraquinone, 5-amino-1-palmitoylamino-anthraquinone, 5-amino-1-stearoylamino-anthraquinone, 4-, 5- or 8-amino-1-benzoylamino-anthraquinone, 5-amino-1,4-dibenzoylamino-anthraquinone, 4-amino-1-(2-, 3- or 4-chloro-benzoylamino)-anthra-quinone, 4-amino-1-(4-fluoro-benzoylamino)-anthraquinone, 4-amino-1-(2,4-difluoro-benzoylamino)-anthraquinone, 4-amino-1-(2,4-, 2,5- or 3,4-dichloro-benzoylamino)-anthraquinone, 4-amino-1-(2,4,5-trichloro-benzoylamino)-anthraquinone, 4-amino-1-(2,3,4,5-2,3,5,6- or 2,3,4,6-tetrachloro-benzoylamino)-anthraquinone, 4-amino-1-(pentachloro-benzoylamino)-anthraquinone, 4-amino-1-(4-fluoro-2-chloro-benzoylamino)-anthraquinone, 4-amino-1-(2-fluoro-4-chloro-benzoylamino)-anthraquinone, 4- or 5-amino-1(2-bromo-benzoylamino)-anthraquinone, 4- or 5-amino-1-(4-chloro-2-bromo-benzoylamino)-anthraquinone, 4- or 5-amino-1-(2-chloro-4-bromo-benzoylamino)-anthraquinone, 4- or 5-amino-1-(2,4-dibromo-benzoylamino)-anthraquinone, 4- or 5-amino-1-(2-, 3- or 4-nitro-benzoylamiono)-anthraquinone, 4- or 5-amino-1-(4- or 6-chloro-3-nitro-benzoylamino)-anthraquinone, 4- or 5-amino-1-(2,4- or 3,5-dinitro-benzoylamino)-anthraquinone, 4- or 5-amino-1-phenyl-acetylamino-anthraquinone, 4- or 5-amino-1-(4-chloro-phenylacetyl-amino)-anthraquinone, 4- or 5-amino-1-(4-nitro-phenylacetylamino)-anthraquinone, 4- or 5-amino-1-(2- or 3-methyl-benzoylamino)-anthraquinone, 4- or 5-amino-1-(3-trifluoromethyl-benzoylamino)-anthraquinone, 4- or 5-amino-1-(4-nitro-3-methyl-benzoylamino)-anthraquinone, 4- or 5-amino- 1-(4-methyl-benzoylamino)-anthraquinone, 4- or 5-amino-1-(4-trifluoromethyl-benzoylamino)-anthraquinone, 4- or 5-amino-1-(4-methyl-phenylacetylamino)-anthraquinone, 4- or 5-amino-1-(4-tert.butyl-benzoylamino)-anthraquinone, 4- or 5-amino-1-(4-phenyl-benzoylamino)-anthraquinone, 4- or 5-amino-1-(3-carboxy-benzoylamino)-anthraquinone, 4- or 5-amino-1-(3- or 4-carbamoyl-benzoylamino)-anthraquinone, 4- or 5-amino-1-(4-methylcarbamoyl-benzoylamino)-anthraquinone, 4- or 5-amino-1-(-n-butylcarbamoyl-benzoylamino)-anthraquinone, 4- or 5-amino-1-(4-phenylcarbamoyl-benzamoyl)-anthraquinone, 4- or 5-amino-1-[4-(2-chloro-phenylcarbamoyl)-benzoylamino—]-anthraquinone, 4- or 5-amino-1-[4-(sulpholan-3-yl-phenylcarbamoyl)-benzoylamino]-anthraquinone, 4- or 5-amino-1-(2-hydroxy-benzylamino)-anthraquinone, 4- or 5-amino-1-(2-methoxy-benzoylamino)-anthraquinone, 4- or 5-amino-1-(4-chloro-2-hydroxy-benzoylamino)-anthraquinone, 4- or 5-amino-1-(2-chloro-4-hydroxy-benzoylamino)-anthraquinone, 4- or 5-amino-1-(-methoxy-benzoylamino)-anthraquinone, 4- or 5-amino-1-(3-sulphamoyl-benzoylamino)-anthraquinone, 4- or 5-amino-1-(2-chloro-3-sulphamoyl-benzoylamino)-anthraquinone, 4-amino-1-(naphthoyl-1- or -2-amino)-anthraquinone, 8-amino-1-(2-, 3- or 4-chloro-benzoylamino)-anthraquinone, 8-amino-1-(2,4-, 2,5-, or 3,4-dichloro-benzoylamino)-anthraquinone, 8-amino-1-(4-nitro-benzoylamino)-anthraquinone, 8-amino-1-(4-nitro-benzoyl-amino)-anthraquinone, 8-amino-1-(3- or 4-methyl-benzoylamino)-anthraquinone, 8-amino-1-(3- or 4-trifluoromethyl-benzoylamino)-anthraquinone, 8-amino-1-(4-methoxy-benzoylamino)-anthraquinone, 5,8-dichloro-4-amino-1-benzoylamino)-anthraquinone, 5,8-dichloro-4-amino)2-, 3- or 4-chloro- or 2,4-dichloro- or 4-methylbenzoylamino)-anthraquinone, 4- or 5-amino-1-hydroxy-anthraquinone, 4,8-diamino-1-hydroxy-anthraquinone, 4,5,8-triamino-1-hydroxy-anthraquinone, 8-chloro-5-amino-1,4-dihydroxy-anthraquinone, 5-8-dichloro-1,4-diamino-anthraquinone, 8-nitro-4-amino-1,5-dihydroxy-anthraquinone, 4,8-diamino-1,5-dihydroxy-anthraquinone, 5-nitro-4-amino-1,8-dihydroxy-anthraquinone, 4,5-diamino-1,8-dihydroxy-anthraquinone, 8-amino-1,4,5-trihydroxy-anthraquinone, 4-amino-1-methoxy- or iso-propoxy-anthraquinone, 1-amino-4-hydroxy-2-phenoxy-anthraquinone, 8-chloro-4-amino-1-hydroxy- or methoxy-anthraquinone, 2,6-dibromo-1,5-diamino-4,8-dihydroxy-anthraquinone, the mixture which is obtained in the bromination of 4,8-diamino-1,5-dihydroxy-anthraquinone or of 4,5-diamino-1,8-dihydroxy-anthraquinone in, e.g., sulphuric acid, and which contains approximately one atom bromine for each mol 4,8-diamino-1,5-dihydroxy- or 4,5-diamino-1,8-dihydroxy-anthraquinone, 1-amino-anthraquinone-2-carboxylic acid, 1-amino-anthraquinone-2-carboxylic acid amide, 1-amino-anthraquinone-2-carboxylic acid-methyl ester, -propyl ester or butyl ester, 1-amino-2-acetyl-anthraquinone, 4-amino-1-(p-toluene-sulphamido)-2-(phenyl- sulphonyl)-anthraquinone, 1-amino-6-methylmercapto-anthraquinone, 1-amino-6-phenylmercapto-anthraquinone, 1-amino-6-methylsulphonyl-anthraquinone and 1-amino-6-(4-chloro-phenylsulphonyl)-anthraquinone.

Suitable carboxylic acid derivatives are, for example, the halides, particularly the fluorides, chlorides and bromides, or the esters, especially the methyl esters or ethyl esters of carboxylic acids of the formula (IV), such as 2,3,4,5-tetra-chloro-benzoic acid, 2,3,5,6-tetrachloro-benzoic acid or 2,3,4,6-tetrachloro-benzoic acid.

The dyestuffs of the formula (I) obtained are suitable for the dyeing of most varied materials, for example, as vat dyestuffs for the dyeing of cellulose fibers, but particularly as pigments. Due to their outstanding light-fastness and good fastness to migration, they can be used for pigment applications of the greatest variety.

The new dyestuffs of the formula (I) are obtained in a form suitable for pigments, or they can be converted into a finely divided form suitable for pigments by known after-treatment, for example by dissolving or swelling in strong inorganic acids, such as sulphuric acid, and discharge on to ice. The finely divided form can also be achieved by grinding with or without grinding auxiliaries, such as inorganic salts or sand, optionally in the presence of solvents, such as toluene xylene, dichlorobenzene or N-methyl-pyrrolidone. The tinctorial strength and transparency of the pigment can be influenced by varying the after-treatment.

The pigments according to the invention can be used for the preparation of very fast-pigmented systems, such as mixtures with other substances, preparations, coating agents, printing pastes, colored paper and colored macromolecular materials. The term "mixture with other substances" may comprise, for example, mixtures with inorganic white pigments, such as titanium dioxide (rutile) or with cement. Preparations are, for example, flush pastes with organic liquids, or pastes and fine-pastes with water, dispersing agents and possibly preserving agents. The term coating agents stands, for example, for physically or oxidatively drying lacquers, stoving enamel lacquers, reaction lacquers, two-component lacquers, disperse dyes for weather-resistant coatings and size colors. Printing colors include those for paper, textile and tin-plate printing. The macromolecular substances can be of natural origin, such as rubber, they can be obtained by chemical modification, such as acetyl cellulose, cellulose butyrate or viscose rayon, or they may be produced synthetically, such as polymers, polyaddition and polycondensation products. There may be mentioned plastic materials, such as polyvinyl chloride, polyvinyl acetate, polyvinyl propionate and polyolefins, for example, polyethylene or polypropylene; polyesters, for example, polyethylene terephthalate; polyamides, superpolyamides, polymers and copolymers obtained from acrylates, methacrylates, acrylonitrile, acrylamide, butadiene, styrene, as well as polyurethanes and polycarbonates. The materials pigmented with the products claimed may be available in any form.

The compounds according to the invention possess outstanding pigment properties; they have not only excellent fastness to water, oil, acids, lime, alkalies, solvents, top-finishes, overspraying, sublimation, resistance to heat, stability to vulcanizing, but they also give very good yields, they are readily dispersable in synthetic compositions, and are outstandingly fast to light and weather.

The parts given in the Examples are parts by weight.

EXAMPLE 1:

a. 10.0 parts of thoroughly ground 1,5-diamino-anthraquinone are introduced at 100°C into a solution of 23.3 parts 2,3,4,5-tetrachloro-benzoyl-chloride in 600 parts nitrobenzene. The solution is heated to 210°C within 1 hour, while stirring, and stirring is continued at this temperature for a further 4 hours. The product is filtered off with suction at 170°C, further washed with nitrobenzene at 170°C, washed, after cooling to 60°C, with methanol until free from nitrobenzene, and dried at 50°C in an air-circulating drying cabinet. There are obtained 28.3 parts 1,5-di-(2,3,4,5-tetrachloro-benzoylamino)-anthraquinone in the form of greenish yellow, fan-folded needles which dissolve with a lemon-yellow color in concentrated sulphuric acid.

When the 1,5-diamino-anthraquinone is replaced by equal parts of 1,4-diamino-anthraquinone, 27.0 parts 1,5-di-(2,3,4,5-tetrachloro-benzoylamino)-anthraquinone are obtained in the form of orange-red, beam-shaped prisms which dissolve in concentrated sulphuric acid with a red-orange color.

When the 1,5-diamino-anthraquinone is replaced by an equivalent amount of 4,8-diamino-1,5-dihydroxy-anthraquinone (11.35 parts) and 23.3 parts 2,3,4,5-tetrachloro-benzoyl-chloride, 31.3 parts 4,8-di-(2,3,4,5-tetrachloro-benzoylamino)-1,5-dihydroxy-anthraquinone are obtained in the form of dark red, cuboid prisms which dissolve in concentrated sulphuric acid with an orange color.

b. Eight parts 1,5-di-(2,3,4,5-tetrachloro-benzoylamino)-anthraquinone which were converted into a finely divided form by grinding in a vibratory mill with 2 parts xylene and 160 parts sodium chloride, and washing out the common salt portions, are ground with a stoving enamel lacquer obtained from 25 parts coconut oil alkyd resin (40 percent coconut oil), 10 parts melamine resin, 50 parts toluene and 7 parts glycol-monomethyl ether on an automatic Hoover-Muller grinding machine. The mixture is applied to the substratum to be lacquered, the lacquer hardened by stoving at 130°C and a yellow lacquer coating of good covering capacity, very good fastness to top finishes, and outstanding fastness to light and weather is obtained. Pigmented stoving enamel lacquers of the same fastness properties are obtained when 15 – 25 parts of the above alkyd resin or of an alkyd resin based on cotton seed oil, castor oil or synthetic fatty acids are used, and the above-mentioned amount of melamine resin is replaced by 10 – 15 parts of the above-mentioned melamine resin or of a condensation product of formaldehyde with urea or with benzoguanamine are used. Pigmented stoving enamel lacquers of similar good fastness properties and of a red color shade are obtained when, instead of the above-mentioned 1,5-di-(2,3,4,5-tetrachloro-benzoylamino)-anthraquinone, corresponding amounts of finely divided 1,4-di-(2,3,4,5-tetrachloro-benzoylamino)-anthraquinone, or 4,8-di-(2,3,4,51,5-dihydroxy-anthraquinone are used. When, instead of the above-mentioned pigment amount, 1 to 10 parts of a mixture of titanium dioxide (rutile type) are dispersed in the lacquer indicated in Example 1b with one of the pigments indicated in Example 1b, in a ratio of 0.5 – 50 : 1, there are obtained, when working up in the same manner, lacquer coatings of the same fastness properties and with an increasing titanium dioxide content, which have a yellow or red shade shifted to white. Lacquer coatings with similar fastness properties are obtained with the use of physically drying spirit varnishes, zapon and nitrocellulose lacquers, of oven- and air-drying oil, of synthetic resin and nitrocombination lacquers, of oven- and air-drying epoxy resin lacquers, optionally in combination with urea, melamine, alkyd or phenol resins.

When reaction lacquers are used based on an unsaturated polyester resin or amine-hardening epoxy resin lacquer with dipropylene-triamine as amine component, yellow or red lacquer coatings of outstanding weather resistance and efflorescence fastness are obtained.

A pigmentation of similar fastness property is obtained by using other two-component lacquers based on aromatic or aliphatic isocyanates and hydroxyl group-containing polyethers or polyesters as well as with moisture-drying polyisocyanate lacquers yielding polyurea lacquer coatings.

c. Five Parts of a fine-paste obtained by kneading 50 parts 1,5-di-(2,3,4,5-tetrachloro-benzoylamino)-anthraquinone with 15 parts of an aryl-polyglycol ether emulsifier and 35 parts water are mixed with 10 parts barium sulphate as filler, 10 parts titanium dioxide (rutile type) as white pigment, and 40 parts of an aqueous disperse dye containing about 50 percent polyvinyl acetate. The dye is spread and, after drying, yellow coatings are obtained of very good resistance to lime and cement as well as of outstanding weather resistance and light-fastness.

The fine-paste obtained by kneading is as suitable for pigmentation of clear polyvinyl acetate-disperse dyes as for disperse dyes containing copolymers of styrene and maleic acid as binding agent, as well as for disperse dyes based on polyvinyl propionate, polymethacrylate or butadiene-styrene, and for coating colors for brushing onto wallpaper, based on sizes with chalk. Paint coatings of a red shade and similar fastness properties are obtained when the above 1,5-di-(2,3,4,5-tetrachloro-benzoylamino)-anthraquinone is replaced by corresponding quantities of 1,4-di-(2,3,4,5-tetrachloro-benzoylamino)-anthraquinone or 4,8-di-(2,3,4,5-tetrachloro-benzoylamino)-1,5-dihydroxy-anthraquinone.

For the production of the pigment paste, there may also be used other non-ionic emulsifiers, such as the reaction products of nonylphenyol with ethylene oxide, or ionic wetting agents, such as the sodium salts of alkylaryl-sulphonic acids, for example, of dinaphthylmethane-disulphonic acid, the sodium salts of substituted sulphonic fatty acid esters, and the sodium salts of paraffin sulphonic acid in combination with alkylpolyglycol ethers.

d. A mixture of 65 parts polyvinyl chloride, 35 parts diiso-octylphthalate, 2 parts dibutyl-tin-mercaptide, 0.5 parts titanium dioxide and 0.5 parts 1,5-di-(2,3,4,5-tetrachlorobenzoylamino)-anthraquinone, which was converted into a finely divided form by grinding with sodium chloride in the presence of test benzine, is pigmented at 165°C on mixing rolls. An intensely yellow-colored composition is obtained which is suitable for the production of foils and molded articles The coloration is characterized by outstanding fastness to light, very good plasticizer fastness. Colorations of a red shade and similar fastness properties are obtained when the above 1,5-di-(2,3,4,5-tetrachloro-benzoylamino--anhraquinone is replaced by corresponding quantities of 1,4-di-(2,3,4,5-tetrachloro-benzoylamino-anthraquinone, or 4,8-di-(2,3,4,5-tetrachloro-benzoylamino)-1,5-dihydroxy-anthraquinone.

Yellow or red moulded articles of very good light- and migration-fastness are obtained when 0.2 parts of the afore-mentioned, finely divided pigments are mixed with 100 parts polyethylene, polypropylene or polystyrene granulate and directly injection-molded at 220° to 280°C in an injection-molding machine or worked up in an extruder to give colored rods, or on mixing rolls to give colored rolling sheets. The sheets or rods may be granulated, if desired, and injection-molded in an injection-molding machine.

In a similar manner, synthetic polyamides obtained from caprolactam or adipic acid and hexamethylene diamine, or the condensation products of terephthalic acid and ethylene glycol can be pigmented at 280°–300°C, optionally under a nitrogen atmosphere.

When 1 part of the mentioned, finely divided pigments is mixed with 10 parts titanium dioxide (rutile type) and 100 parts of a copolymer present in pulverized form and based on acrylonitrile-butadiene-styrene and the mixture is pigmented at 140°–180°C on a roller mill, a yellow or red rolling sheet is obtained which is granulated and injection-moulded at 200°–250°C in an injection moulding machine. Yellow or red moulded articles are obtained of very good fastness to light and migration as well as of excellent heat resistance.

In a similar manner, but at temperatures from 180°–220°C and without the addition of titanium dioxide, synthetic materials based on cellulose acetate or cellulose butyrate and mixtures thereof are pigmented with similar fastness properties.

A yellow or red, transparent granulate of outstanding fastness to light and heat resistance is obtained when 0.2 parts of the mentioned pigments in a finely divided form are mixed at 250°–280°C with 100 parts of a synthetic material based on polycarbonate in an extruder or in a screw kneader and the mixture is worked up to give a granulate.

e. Ninety parts of a slightly branched polypropylene glycol of molecular weight 2500 and a hydroxyl number 56, 0.25 parts endo-ethylene-piperazine, 0.3 parts tin(II)-octoate, 1.0 part of a polyether siloxane, 3.5 parts water, 12.0 parts of a dispersion of 10 parts of finely divided 1,5-di-(2,3,4,5-tetrachlorobenzoylamino)-anthraquinone in 50 parts of the above-mentioned polypropylene glycol are thoroughly mixed with one another, subsequently intimately mixed with 45 parts toluylene-diisoyanate (80 percent 2,4- and 20 percent 2,6-isomer) and poured into a mould. The mixture becomes turbid after 6 seconds followed by the formation of a plastic foam material. After 70 seconds an intensely yellow colored, soft polyurethane foam material has formed, the pigmentation of which exhibits outstanding fastness properties.

A yellow polyurethane soft foam material of the same light-fast pigmentation is obtained when 90 parts of a slightly branched polyester obtained from adipic acid, diethylene glycol and trimethylol-propane of molecular weight 2,000 and a hydroxyl number of 60 is mixed with the following components: 1.2 parts dimethylbenzylamine, 2.5 parts sodium castor oil sulphate, 2.0 parts of an ethoxylated, benzylated hydroxy-diphenyl, 1.75 parts water, 12 parts of a paste produced by dispersing 10 parts finely divided 1,5-di-(2,3,4,5-tetrachloro-benzoylamino)-anthraquinone in 50 parts of the above-mentioned polyester; after mixing, 40 parts toluylene-diisocyanate (65 percent 2,4 and 35 percent 2,6-isomer) are stirred into the mixture which is poured into a mould and diluted. Red polyurethane soft-foam materials of similar light-fast pigmentation are obtained by replacing the 1,5-di-(2,3,4,5-tetrachloro-benzoylamino)-anthraquinone by the corresponding amounts of 1,4-di-(2,3,4,5-tetrachloro-benzoylamino)-anthraquinone or 4,8-di-(2,3,4,5-tetrachloro-benzoylamino)-1,5-dihydroxy-anthraquinone.

f. Red offset prints of high brilliancy and tinctorial strength and of very good fastness to light and top finishes are obtained with a printing ink obtained by dispersing 35 parts finely divided 1,4-di-(2,3,4,5-tetrachloro-benzoylamino)-anthraquinone and 65 parts linseed oil, and by the addition of 1 part siccative (Co-naphthenate, 50 percent in test benzine). The use of this printing ink in book, photogravure, lithographic or steel engraving printing, leads to red prints of similar fastness properties. When the pigment is used for pigmenting tin plate printing or low viscous intaglio printing colors, or printing inks, red prints of similar fastness properties are obtained. When the 1,4-di-(tetrachloro-benzoylamino)-anthraquinone is replaced by the corresponding amounts of 1,5-di-(2,3,4,5-tetrachloro-benzoylamino)-anthraquinone, brilliant yellow prints of similar fastness are obtained. When the corresponding amounts of 4,8-di-(2,3,4,5-tetrachloro-benzoylamino)-1,5dihydroxy-anthraquinone are used, red prints of similar brilliancy and fastness are obtained.

g. A printing paste is prepared from 10 parts of one of the pigment fine-pastes mentioned in Example 1c, 100 parts tragacanth (3 percent), 100 parts of an aqueous 50 percent egg protein solution and 25 parts of a non-ionic wetting agent. A textile fiber fabric is printed and steamed at 100°C; a yellow or red print is obtained which is characterized by excellent fastness properties, particularly light-fastness. Instead of the tragacanth and egg protein in the printing mixture, other binding agents suitable for fixing on the fiber can be used, for example, those based on synthetic resins, British gum or cellulose glycolate.

h. A mixture of 100 parts of crepe (light), 2.6 parts sulphur, 1 part stearic acid, 1 part mercapto-benzothiazole, 0.2 parts hexamethylene-tetramine, 5 parts zinc oxide, 60 parts chalk and 2 parts titanium dioxide (anatase type) is pigmented at 50°C on mixing rolls with 2 parts 1,5-di-(2,3,4,5-tetrachloro-benzoylamino)-anthraquinone and then vulcanized at 140°C for 12 minutes. A yellow-pigmented vulcanized product of very good fastness to light is obtained.

A red-pigmented vulcanized product of similar light-fastness is obtained when corresponding amounts of 1,4-di-(2,3,4,5-tetrachloro-benzoylamino)-anthraquinone or 4,8-di-(2,3,4,5-tetrachloro-benzoylamino)-1,5-dihydroxy-anthraquinone are used instead of 1,5-di-(2,3,4,5-tetrachloro-benzoylamino)-anthraquinone.

i. One hundred parts of a 20 percent aqueous paste of 1,5-di-(2,3,5-tetrachloro-benzoylamino)-anthraquinone produced, for example, by dissolving at −5° to +5°C the dyestuff in 96 percent sulphuric acid, discharging on ice, filtration and washing neutral with water, are added in an agitator to 22,500 parts of an aqueous, approximately 9 percent viscose solution. The pigmented mass is stirred for 15 minutes, subsequently de-aerated and subjected to a spinning and desulphurising process. Yellow colored filaments or foils of very good fastness to light are obtained.

Red-pigmented filaments and foils of similar fastness are obtained when a 20 percent solution of acetyl cellulose in acetone or a 15 - 25 percent solution of polyacrylonitrile in dimethyl formamide pigmented with the finely divided 1,4-di-(2,3,4,5-tetrachloro-benzoylamino)-anthraquinone or 4,8-di-(2,3,4,5-tetrachloro-benzoylamino)-1,5-dihydroxy-anthraquinone, is subjected to a dry-spinning process.

k. Ten thousand parts of paper pulp containing 4 parts per 100 parts cellulose, are treated in a hollander for about 2 hours. During this time, there are added, at intervals of 15 minutes, 4 parts resin glue, then 30 parts of a 16 percent pigment dispersion obtained by grinding in a ball mill 4.8 parts 1,5-di-(2,3,4,5-tetrachloro-benzoylamino)-anthraquinone with 4.8 parts dinaphthyl-methane disulphonic acid and 22 parts water and subsequently 5 parts aluminum sulphate. After finishing on in the paper machine, a yellow-colored paper of outstanding light fastness and resistance to solvents is obtained.

Red paper of similar fastness is obtained when the 1,5-di-(2,3,4,5-tetrachloro-benzoylamino)-anthraquinone used is replaced by corresponding amounts of 1,4-di-(2,3,4,5-tetrachloro-benzoylamino)-anthraquinone or 4,8-di-(2,3,4,5-tetrachloro-benzoylamino)-1,5-dihydroxy-anthraquinone.

l. The yellow or red pigmented paper produced according to Example 1k is impregnated with a 55 percent solution of an urea-formaldehyde resin in n-butanol and stoved at 140°C. Yellow or red laminated paper is obtained of very good fastness to migration and outstanding fastness to light.

A laminated paper of the same fastness properties is obtained by laminating a paper which was printed by gravure printing process with a printing color containing one of the pigment fine-pastes and water-soluble or saponifiable binding agents.

m. 0.2 Parts 1,5-di-(2,3,4,5-tetrachloro-benzoylamino)-anthraquinone are pasted in 50 parts water at 50°C and the paste is poured into a solution at 25°– 30°C of 1.2 parts by volume of a caustic soda solution of 38 Be and 1.0 part sodium hydrosulphite in 150 parts water. In the brown vat obtained after 20 – 30 minutes, 10 parts cotton are dyed at 25°– 30°C for 45 minutes with the addition of 4 parts Glaubers' salt. After dyeing, the material is rinsed in cold tap water until the oxidation is completed, then acidified and soaped at boiling temperature. A brilliant yellow dyeing of excellent fastness properties is obtained.

When the 1,5-di-(2,3,4,5-tetrachloro-benzoylamino)-anthraquinone is replaced by the corresponding amounts of 1,4-di-(2,3,4,5-tetrachloro-benzoylamino)-anthraquinone, a scarlet-red dyeing of similar fastness properties is obtained on cotton from a red-brown vat. A violet dyeing of similar fastness properties is obtained on cotton when 0.2 parts 4,8-di-(2,3,4,5-tetrachloro-benzoylamino)-1,5-dihydroxy-anthraquinone are used.

Example 2

A mixture of 450 parts nitrobenzene, 22.5 parts 2,3,4,5-tetrachloro-benzoic acid and 10.0 parts by volume thionyl chloride is heated at 140°C for 1 hour in a glass apparatus provided with stirrer, thermometer and reflux condenser, and the mixture is kept at the same temperature for 1 hour. It is then cooled to 100°C and dry air is passed through the apparatus for 5 minutes. 10.0 parts finely pulverized 1,5-diamino-anthraquinone are introduced at the same temperature which is raised to 200° to 210°C within 1 hour and maintained for 3 hours. The precipitated dyestuff is filtered off on a pre-heated suction-filter and the product after-washed twice with portions of 50 parts nitrobenzene at 200°C. It is subsequently washed with methanol until nitrobenzene is no longer present. There are obtained 28.3 parts of the 1,5-di-(2,3,4,5-tetrachloro-benzoylamino)-anthraquinone described in Example 1a, which is identical with the dyestuff described in Example 1a in respect to its properties.

According to the methods of Example 1b to 1m, pigmentations and dyeings with the same yellow shade, the same tinctorial strength and the same fastness properties are obtained.

Example 3

A mixture of 20.0 parts 2,3,4,5-tetrachloro-benzoic acid, 500 parts o-dichlorobenzene and 9.0 parts by volume thionyl chloride is treated according to Example 2. After cooling it to 100°C, 6.5 parts pyridine and 10.0 parts 1,4-diamino-anthraquinone in finely pulverized form are added, the temperature is raised to 170°–180°C within 1½ hour and maintained for 3½ hours.

The precipitated dyestuff product is filtered off with suction at 150°C on a pre-heated suction-filter and the product after-washed with o-dichlorobenzene at 150°C until the runnings are colorless. It is subsequently washed first with methanol and then with hot water. There are obtained 24.6 parts 1,4-di-(2,3,4,5-tetrachloro-benzoylamino)-anthraquinone in the form of orange-colored needles which dissolve in concentrated sulphuric acid with an orange color. According to the methods described in Example 1b to 1m orange-red pigmentations and dyeings with very good fastness properties are obtained.

When, instead of 1,4-diamino-anthraquinone, the same amounts of 1,8-diamino-anthraquinone and, instead of 2,3,4,5-tetrachlorobenzoic acid the same amounts of 2,3,5,6-tetrachloro-benzoylamino)-anthraquinone in the form of yellow prisms which dissolve in concentrated sulphuric acid with a brownish yellow color. Yellow pigmentations with very good fastness properties are obtained according to the methods described in Examples 1b to 1l. When 1,4-diamino-anthraquinone is replaced by equivalent amounts of 1,5-diamino-4-hydroxyanthraquinone, there is obtained 1,5-di-(2,3,4,5-tetrachlorobenzoylamino)-4-hydroxy-anthraquinone in the form of brown prisms which dissolve in concentrated sulphuric acid with a red-brown color. According to the methods described in Examples 1b to 1l brown pigmentations with very good fastness properties are obtained.

Example 4

A mixture of 8.3 parts 2,3,4,5-tetrachloro-benzoic acid, 5.0 parts by volume thionyl chloride and 200 parts nitrobenzene is treated according to Example 2. 10.0 parts 4-amino-1-benzoylamino-anthraquinone are then introduced at 100°C, the reaction mixture is heated to reflux temperature within one hour and this mixture is kept for 3 hours at boiling temperature under slight reflux. After working up according to Example 1a or 2, there are obtained 14.3 parts 4-benzoylamino-1-(2,3,4,5-tetrachloro-benzoylamino)-anthraquinone in the form of red needles which dissolve in concentrated sulphuric acid with a red color. Red pigmentations and dyeings with very good fastness properties are obtained according to the methods described in Examples 1b to 1m.

Instead of 200 parts nitrobenzene, there may be used 150 to 800 parts nitrobenzene, trichlorobenzenes, dichlorobenzenes, o-chloro-nitrobenzene or naphthalene.

When the 4-amino-1-benzoylamino-anthraquinone is replaced by equivalent amounts of 4-amino-1-(4-chloro-benzoylamino)-anthraquinone and equal amounts of 2,3,4,5-tetrachloro-benzoic acid, there is obtained 4-(4-chloro-benzoylamino)-1-(2,3,4,5-tetrachloro-benzoylamino)-anthraquinone in the form of red needles which dissolve in concentrated sulphuric acid with an orange-red color and yield, when used according to Example 1b to 1m, red pigmentations and dyeings with very good fastness properties.

Example 5

Half to three quarters of a solution of 30.0 parts 2,3,4,5-tetrachloro-benzoyl chloride in 180 parts nitrobenzene are added dropwise at 45° to 50°C, within 45 minutes, to a mixture of 25.0 parts 1,4-diamino-anthraquinone, 15.0 parts collidine and 400 parts nitrobenzene. The mixture is heated to 120°C. After cooling to 45°–50°C, the remainder of the solution is added dropwise thereto within 1 hour, the mixture is again heated to 120°C and then allowed to cool. The product is filtered off with suction at 20°C, covered with cold nitrobenzene, the nitrobenzene is washed out with methanol, and the product finally washed with hot water; after drying, there are obtained 46.4 parts 4-amino-1-(2,3,4,5-tetrachloro-benzoylamino)-anthraquinone in the form of a product of metallic luster and consisting of violet beam-shaped prisms, which dissolves in concentrated sulphuric acid with a bluish red color. The compound is suitable as intermediate product for further reaction. When it is used according to Examples 1b, 1c, 1e and 1i, it yields violet pigmentations of excellent fastness to light and good fastness to migration.

Instead of collidine, equivalent amounts of pyridine, lutidine, quinoline or N,N-dimethylaniline can be used. The solution of pentachloro-benzoyl chloride can be obtained according to Example 3 or 4 by the reaction of equivalent amounts of pentachloro-benzoic acid.

When 2,3,4,5-tetrachloro-benzoylchloride is replaced by equal amounts of 2,3,4,5- or 2,3,5,6-tetrachloro-benzoylchloride, 44 to 48 parts 4-amino-1-(2,3,4,6- or 2,3,5,6-tetrachloro-benzoylamino)-anthraquinone of similar appearance are obtained. According to Examples 1b, 1c, 1e, 1i, the compounds yield violet pigmentations of very good to excellent fastness to light and good general fastness properties. The compounds can be used for further reactions.

Example 6

When 10.0 parts 4-amino-1-benzoylamino-anthraquinone are reacted according to Example 1a, but in the presence of 5.5 parts N,N-dimethylaniline, with 8.0 parts 2,3,4,5-tetrachloro-benzoyl-fluoride, 13.9 parts 1-benzoylamino-4-(2,3,4,5-tetrachloro-benzoylamino)-anthraquinone are obtained which, in respect to its properties and its pigment behavior, is identical with the dyestuff according to Example 4.

EXAMPLE 7

A mixture of 500 parts nitrobenzene, 22.5 parts 2,3,4,5-tetrachloro-benzoic acid and 10.0 parts by volume thionyl chloride is reacted according to Example 2, but 10.0 parts finely pulverized 1,4-diamino-anthraquinone and 0.2 parts dimethyl formamide are introduced at 100°C; there are obtained, after further reacting according to Example 2, 26.5 parts 1,4-di-(2,3,4,5-tetrachloro-benzoylamino)-anthraquinone which is identical with the dyestuff mentioned in Example 1 and has the same dyestuff and pigment properties.

EXAMPLE 8

A mixture obtained by grinding together 10.0 parts 4-amino-1-(2,4-dichloro-benzoylamino)-anthraquinone and 2.0 parts potassium carbonate is introduced at 70°C into a solution of 9.0 parts 2.3,4,5-tetrachloro-benzoyl-bromide in 360 parts o-xylene. The solution is heated to 140°C within 1 hour, while stirring, and stirred under reflux while gently boiling until all 3-amino-1-(2,4-dichloro-benzoylamino)-anthraquinone is reacted. There are obtained, after suction-filtration at 110°C, washing with o-xylene at 100°C, further washing with methanol, subsequent washing with hot water until the whole suction-filtered material is salt-free, and drying at 80°C in a circulating air cabinet, 15.7 parts 4-(2,4-dichloro-benzoylamino)-1-(2,3,4,5-tetrachloro-benzoylamino)-anthraquinone in the form of brown-red prisms which dissolve in concentrated sulphuric acid with a dark red color.

Instead of potassium carbonate, equivalent amounts of sodium carbonate, pyridine, N,N-dimethylaniline, morpholine or piperidine can be used. Instead of 360 parts o-xylene, 150–700 parts o-, m- or p-xylene or mixtures thereof, chlorobenzene, dichlorobenzene or nitrobenzene may be used.

According to the methods described in Examples 1b to 1m, yellowish red pigmentations or dyeings with good to very good fastness properties and excellent fastness to light are obtained.

EXAMPLE 9

There are obtained, according to Example 4, with the use of 8.3 parts 2,3,4,5-tetrachloro-benzoic acid and 14.1 parts of the 4-amino-1-(2,3,4,5-tetrachloro-benzoylamino)-anthraquinone described in Example 5, instead of 10.0 parts 4-amino-1-benzoyl-amino-anthraquinone, 11.1 parts of the 1,4-di-(tetrachloro benzoylamino)-anthraquinone described in Examples 1 and 7.

EXAMPLE 10

14.1 Parts of the 4-amino-1-(2,3,4,5-tetrachloro benzoylamino)-anthraquinone described in Example 5, instead of 10.0 parts 4-amino-1-benzoylamino-anthraquinone, yield according to Example 4 with the use of equivalent amounts of pentachlorobenzoic acid, instead of 8.3 parts 2,3,4,5-tetrachlorobenzoic acid, 19.6 parts 4-(2,3,4,5-tetrachloro-benzoylamino)-1-(pentachloro-benzoylamino)-anthraquinone in the form of brownish red needles which dissolve in concentrated sulphuric acid with an orange-red color.

The same compound is obtained by operating according to Example 9, but using, instead of 14.1 parts 4-amino-1-(2,3,4,5-tetrachloro-benzoylamino)-anthraquinone, 15.1 parts of the 4-amino-1-(pentachloro-benzoylamino)-anthraquinone produced according to Example 5 with the use of an equivalent amount of pentachloro-benzoylchloride, instead of 2,3,4,5-tetrachloro-benzoylchloride. According to Examples 1b to 1m, orange-red pigmentations and dyeings with good fastness properties and very good light-fastness are obtained.

EXAMPLE 11

According to Example 1a, but with the use of 11.2 parts 1,4,5,8-tetraamino-anthraquinone, instead of 10.0 parts 1,5-diamino-anthraquinone, there are obtained 26.8 parts of a deep-violet dyestuff in the form of dark violet prisms which dissolve in concentrated sulphuric acid with a brownish green color. The dyestuff predominately consists of the 1,4,5,8-diamino-di-(2,3,4,5-tetrachloro-benzoylamino)-anthraquinone obtainable by diacylation of 1,4,5,8-tetraamino-anthraquinone, small portions of 8-amino-1,4,5-tri-(2,3,4,5-tetrachloro-benzoylamino)-anthraquinone and traces of 1,4,5,8-tetra-(2,3,4,5-tetrachloro-benzoylamino)-anthraquinone. According to the methods described in Examples 1b to 1l violet pigmentations of very good fastness properties are obtained. Dyestuffs of similar fastness properties and similar shades are obtained by using, instead of 23.3 parts 2,3,4,5-tetrachloro-benzoylchloride, equal amounts of 2,3,4,6- or 2,3,5,6-tetrachloro-benzoylchloride. Dyestuff mixtures are obtained which consist of 2,3,4,6- or 2,3,5,6-tetrachloro-benzoylamino-isomers of the mixture described in the first paragraph. According to paragraph 1 of this Example, but with the use of 11.15 parts 4,5,8-triamino-1-hydroxy-anthraquinone, instead of 11.2 parts 1,4,5,8-tetramino-anthraquinone, there are obtained 25.8 parts of a violet dyestuff in the form of violet cuboid prisms which dissolve in concentrated sulphuric acid with a pale brown color. The dyestuff predominately consists of a mixture of 4,5-, 4,8- and 5,8-di-(2,3,4,5-tetrachloro-benzoylamino)-1-hydroxy-anthraquinone and small portions of 4,5,8-tri-(2,3,4,5-tetrachloro-benzoylamino)-1-hydroxy-anthraquinone. According to the methods described in Example 1b to 1l, violet pigmentations of very good fastness properties are obtained.

Dyestuffs of similar fastness properties and of a similar shade are obtained by using, instead of 2,3,4,5-tetrachloro-benzoyl chloride, 2,3,4,6- or 2,3,5,6-tetrachloro-benzoyl-chloride. Dyestuff mixtures are obtained which consist of the mixture of the 2,3,4,6- or 2,3,5,6-tetrachloro-benzoylamino-isomers described in the preceding paragraph.

EXAMPLES 12 to 22

When, according to Example 1a, 1,5-diamino-anthraquinone is replaced by equivalent amounts of other diaminoganthraquinones or diamino-anthraquinone derivatives, the dyestuffs set out in the Table below, which yield, according to the methods described in Examples 1b to 1l, fast pigmentations with the shades specified in the Table.

| Example | Dyestuff | Shade |
|---|---|---|
| 12 | 1,8-di-(2,3,4,5-tetrachloro-benzoylamino)-anthraquinone | yellow |
| 13 | 1,6-di-(2,3,4,5-tetrachloro-benzoylamino)-anthraquinone | green-yellow |
| 14 | 4-chloro-1,5-di-(2,3,4,5-tetrachlorobenzoylamino)-anthraquinone | yellow |
| 15 | 5-nitro-1,4-di-(2,3,4,5-tetrachlorobenzoylamino)-anthraquinone | red |
| 16 | 4,8-di-(2,3,4,5-tetrachlorobenzoylamino)-1-hydroxy-anthraquinone | red-brown |
| 17 | 2,6-di-(2,6-di-(2,3,4,5-tetrachlorobenzoylamino)-anthraquinone | yellowish |
| 18 | 1,7-di-(2,3,4,5-tetrachloro-benzoylamino)-anthraquinone | green-yellow |
| 19 | 4,5-di-(2,3,4,5-tetrachloro-benzoylamino)-1,8-dihydroxy-anthraquinone | red |
| 20 | 5,8-dichloro-1,4-di-(2,3,4,5-tetrachlorobenzoylamino)-anthraquinone | orange |
| 21 | 5,8-di-(2,3,4,5-tetrachloro-benzoylamino)-1,4-dihydroxy-anthraquinone | yellow-red |
| 22 | 3,7-dibromo-4,8-di-(2,3,4,5-tetrachlorobenzoylamino)-1,5-dihydroxy-anthraquinone | violet |

EXAMPLE 23

According to Example 1a, but by replacing the 10 parts 1,5-diamino-anthraquinone by 14.7 parts of the dyestuff which is obtained when 4,8-diamino-1,5-dihydroxy-anthraquinone in sulphuric acid is brominated in such a way that the reaction product contains approximately one atom bromine for each mol 4,8-diamino-1,5-dihydroxy-anthraquinone, a dyestuff is obtained which yields, according to the methods described in Examples 1b to 1g, fast pigmentations with violet shade.

Dyestuffs of similar fastness and similar shade are obtained when 2,3,4,5-tetrachloro-benzoyl-chloride is replaced by 2,3,4,6- or 2,3,5,6-tetrachlorobenzoyl-chloride, or by reacting one of these chlorides with 14.7 parts of the dyestuff which is obtained when 4,5-diamino-1,8-dihydroxy-anthraquinone in sulphuric acid is brominated in such a way that the reaction product contains approximately 1 atom bromine for each mol 4,5-diamino-1,8-dihydroxy-anthraquinone.

EXAMPLES 24 – 41

According to Example 2 with the use of the amount there indicated of 2,3,4,5-tetrachloro-benzoic acid or the same amount of 2,3,4,6- or 2,3,5,6-tetrachlorobenzoic acid and by using or replacing the 10.0 parts 1,5-diamino-anthraquinones by equivalent amounts of other diamino-anthraquinones or diamino-anthraquinone derivatives, the dyestuffs set out in the Table below, which yield, according to the methods described in Examples 1b to 1l, fast pigmentations with the shades specified in the Table.

| Example | Dyestuff | Shade |
|---|---|---|
| 24 | 1,4-di-(2,3,5,6-tetrachloro-benzoylamino)-anthraquinone | orange |
| 25 | 1,4-di-(2,3,4,6-tetrachloro-benzoylamino)-anthraquinone | orange |
| 26 | 1,5-di-(2,3,5,6-tetrachloro-benzoylamino)-anthraquinone | yellow |
| 27 | 1,5-di-(2,3,4,6-tetrachloro-benzoylamino)-anthraquinone | yellow |
| 28 | 1,7-di-(2,3,5,6-tetrachloro-benzoylamino)-anthraquinone | green-yellow |
| 29 | 1,7-di-(2,3,4,6-tetrachloro-benzoylamino)-anthraquinone | green-yellow |
| 30 | 1,8-di-(2,3,4,6-tetrachloro-benzoylamino)-anthraquinone | yellow |
| 31 | 5-nitro-1,4-di-(2,3,5,6-tetrachlorobenzoylamino)-anthraquinone | red-brown |
| 32 | 5-nitro-1,4-di-(2,3,4,6-tetrachlorobenzoylamino)-anthraquinone | brown-red |
| 33 | 5,8-dicloro-1,4-di-(2,3,5,6-tetrachlorbenzoylamino)-nthraquinone | red |
| 34 | 4,8-di-(2,3,5,6-tetrachloro-benzoylamino)-1-hydroxy-anthraquinone | red-brown |
| 35 | 4,8-di-(2,3,4,6-tetrachloro-benzoylamino)-anthraquinone | red-brown |
| 36 | 4,8-di-(2,3,4,5-tetrachloro-benzoylamino)-1,5-dihydroxy-anthraquinone | red |
| 37 | 4,8-di-(2,3,5,6-tetrachloro-benzoylamino)-1,5-dihydroxy-anthraquinone | red |
| 38 | 4,8-di-(2,3,4,6-tetrachloro-benzoylamino)-1,5-dihydroxy-anthraquinone | red |
| 39 | 4,5-di-(2,3,5,6-tetrachloro-benzoylamino)-1,8-dihydroxy-anthraquinone | violet |
| 40 | 4,5-di-(2,3,4,6-tetrachloro-benzoylamino)-1,8-dihydroxy-anthraquinone | violet |
| 41 | 1,4-di-(2,3,5,6-tetrachloro-benzoylamino)-5,8-dihydroxy-anthraquinone | red |

EXAMPLES 42 – 109

According to Example 4, with the use of the amount there indicated of 2,3,4,5-tetrachloro-benzoic acid or an equal amount of 2,3,4,6- or 2,3,5,6-tetrachloro-benzoic acid and by replacing the 10.0 parts 4-amino-1-benzoylamino-anthraquinone by equivalent amounts of other amino-aroylamino-anthraquinoes, there are obtained the dyestuffs set out in the Table below, which yield, according to the methods described in Examples 1b and 1c, fast-pigmented coatings with the shades specified in the following Table.

| Example | Dyestuff | Shade |
|---|---|---|
| 42 | 4-benzoylamino-1-(2,3,5,6-tetrachlorobenzoylamino-anthraquinone | brown |
| 43 | 4-benzoylamino-1-(2,3,4,6-tetrachlorobenzoylamino)-anthraquinone | brown |
| 44 | 4-(4-fluoro-benzoylamino)-1-(2,3,4,5-tetrachloro-benzoylamino)-anthraquinone | orange |
| 45 | 4-(2-chloro-benzoylamino)-1-(2,3,4,5-tetrachloro-benzoylamino)-anthraquinone | red |
| 46 | 4-(3-chloro-benzoylamino)-1-(2,3,4,5tetrachloro-benzoylamino)-anthraquinone | orange |
| 47 | 4-(3-chloro-benzoylamino)-1-(2,3,5,6-tetrachloro-benzoylamino)-anthraquinone | red |
| 48 | 4-(4-chloro-benzoylamino)-1-(2,3,5,6-tetrachloro-benzoylamino)-anthraquinone | orange |
| 49 | 4-(4-chloro-benzoylamino)-1-(2,3,4,6-tetrachloro-benzoylamino)-anthraquinone | red |
| 50 | 4-(3,4-dichloro-benzoylamino)-1-(2,3,4,5-tetrachloro-benzoylamino)-anthraquinone | orange |

| | | |
|---|---|---|
| 51 | (4-(4-fluoro-2-chloro-benzoylamino)-1-(2,3,4,5-tetrachloro-benzoylamino)anthraquinone | orange |
| 52 | 4-(2,3,4,5-tetrachloro-benzoylamino)-1-(2-bromo-benzoylamino)-anthraquinone | red |
| 53 | 4-(2,3,5,6-tetrachloro-benzoylamino)-1-(2-chloro-4-bromo-benzoylamino)anthraquinone | orange |
| 54 | 4-(2,3,4,6-tetrachloro-benzoylamino)-1-(2-nitro-benzoylamino)-anthraquinone | orange |
| 55 | 4-(2,3,4,5-tetrachloro-benzoylamino)-1-(3-nitro-benzoylamino)-anthraquinone | orange |
| 56 | 4-(2,3,5,6-tetrachloro-benzoylamino)-1-(3-nitro-benzoylamino)-anthraquinone | orange |
| 57 | 4-(2,3,4,5-tetrachloro-benzoylamino)-1-(4-nitro-benzoylamino)-anthraquinone | orange |
| 58 | 4-(2,3,4,5-tetrachloro-benzoylamino)-1-(2-chloro-5-nitro-benzoylamino)-anthraquinone | orange |
| 59 | 4-(2,3,4,5-tetrachloro-benzoylamino)-1-(3,5-dinitro-benzoylamino)-anthraquinone | orange |
| 60 | 4-(2,3,4,6-tetrachloro-benzoylamino)-1-(3-methyl-benzoylamino)-anthraquinone | orange |
| 61 | 4-(2,3,4,5-tetrachloro-benzoylamino)-1-(3-trifluoromethyl-benzoylamino)-anthraquinone | red |
| 62 | 4-(2,3,5,6-tetrachloro-benzoylamino)-1-(3-trifluoromethyl-benzoylamino)-anthraquinone | orange |
| 63 | 4-(2,3,4,5-tetrachloro-benzoylamino)-1-(4-methyl-benzoylamino)-anthraquinone | orange |
| 64 | 4-(2,3,5,6-tetrachloro-benzoylamino)-1-(4-trifluoromethyl-benzoylamino)-anthraquinone | orange |
| 65 | 4-(2,3,4,5-tetrachloro-benzoylamino)-1-(4-phenyl-benzoylamino)-anthraquinone | red |
| 66 | 4-(2,3,5,6-tetrachloro-benzoylamino)-1-(3-carbamoyl-benzoylamino)-anthraquinone | brown |
| 67 | 4-(2,3,4,5-tetrachloro-benzoylamino)-1-(4-methylcarbamoyl-benzoylamino)-anthraquinone | red |
| 68 | 4-(2,3,4,5-tetrachloro-benzoylamino)-1-[4-(n-butylcarbamoyl)-benzoylamino]-anthraquinone | red |
| 69 | 4-(2,3,4,5-tetrachloro-benzoylamino)-1-(4-phenylcarbamoyl-benzoylamino)-anthraquinone | orange |
| 70 | 4-(2,3,4,5-tetrachloro-benzoylamino)-1-[4-(2-chloro-phenylcarbamoyl)-benzoylamino]-anthraquinone | orange |
| 71 | 4-(2,3,4,5-tetrachloro-benzoylamino)-1-[4-(sulpholan-3-yl-carbamoyl)-benzoylamino]-anthraquinone | red |
| 72 | 4-(2,3,4,6-tetrachloro-benzoylamino)-1-(2-methoxy-benzoylamino)-anthraquinone | brown |
| 73 | 4-(2,3,4,5-tetrachloro-benzoylamino)-1-(4-methoxy-benzoylamino)-anthraquinone | red |
| 74 | 4-(2,3,5,6-tetrachloro-benzoylamino)-1-(4-methoxy-benzoylamino)-anthraquinone | brown |
| 75 | 4-(2,3,4,5-tetrachloro-benzoylamino)-1-(3-sulfamoyl-benzoylamino)-anthraquinone | orange |
| 76 | 4-(2,3,4,6-tetrachloro-benzoylamino)-1-(naphthoyl-2-amino)-anthraquinone | brown |
| 77 | 4-(2,3,4,5-tetrachloro-benzoylamino)-1-(2-chloro-4-hydroxy-benzoylamino)-anthraquinone | orange |
| 78 | | |
| 79 | 5-benzoylamino-1-(2,3,4,5-tetrachlorobenzoylamino)-anthraquinone | yellow |
| 80 | 5-benzoylamino-1-(2,3,5,6-tetrachlorobenzoylamino)-anthraquinone | yellow |
| 81 | 5-(2,4-difluoro-benzoylamino)-1-(2,3,4,5-tetrachloro-benzoylamino)-anthraquinone | yellow |
| 82 | 5-(2,5-dichloro-benzoylamino)-1-(2,3,4,5-tetrachloro-benzoylamino)-anthraquinone | yellow |
| 83 | 5-(2,4,5-trichloro-benzoylamino)-1-(2,3,4,5-tetrachloro-benzoylamino)-anthraquinone | yellow |
| 84 | 5-(2-fluoro-4-chloro-benzoylamino)-1-(2,3,5,6-tetrachloro-benzoylamino)-anthraquinone | yellow |
| 85 | 5-(2,3,5,6-tetrachloro-benzoylamino)-1-(4-chloro-2-bromo-benzoylamino)-anthraquinone | yellow |
| 86 | 5-(2,3,4,5-tetrachloro-benzoylamino)-1-(2,4-dibromo-benzoylamino)-anthraquinone | yellow |
| 87 | 5-(2,3,4,6-tetrachloro-benzoylamino)-1-(4-chloro-3-nitro-benzoylamino)-anthraquinone | yellow |
| 88 | 5-(2,3,4,6-tetrachloro-benzoylamino)-1-(2,4-dinitro-benzoylamino)-anthraquinone | yellow |
| 89 | 5-(2,3,4,5-tetrachloro-benzoylamino)-1-(2-methyl-benzoylamino)-anthraquinone | yellow |
| 90 | 5-(2,3,4,5-tetrachloro-benzoylamino)-1-(2-methyl-benzoylamino)-anthraquinone | yellow |
| 91 | 5-(2,3,4,5-tetrachloro-benzoylamino)-1-(4-isobutyl-benzoylamino)-anthraquinone | yellow |
| 92 | 5-(2,3,4,5-tetrachloro-benzoylamino)-1-(4-carboxy-benzoylamino)-anthraquinone | yellow |
| 93 | 5-(2,3,4,5-tetrachloro-benzoylamino)-1-(4-carbamoyl-benzoylamino)-anthraquinone | yellow |
| 94 | 5-(2,3,5,6-tetrachloro-benzoylamino)-1-(2-hydroxy-benzoylamino)-anthraquinone | yellow |
| 95 | 5-(2,3,4,5-tetrachloro-benzoylamino)-1-(4-chloro-2-hydroxy-benzoylamino-anthraquinone | yellow |
| 96 | 5-(2,3,4,5-tetrachloro-benzoylamino)-1-(2-chloro-5-sulphamoyl-benzoylamino)-anthraquinone | yellow |
| 97 | 5-(2,3,4,6-tetrachloro-benzoylamino)-1(naphthoyl-1-amino)-anthraquinone | yellow-brown |
| 98 | 8-(2-chloro-benzoylamino)-1-(2,3,4,5-tetrachloro-benzoylamino)-anthraquinone | yellow |
| 99 | 8-(4-chloro-benzoylamino)-1-(2,3,4,5-tetrachloro-benzoylamino)-anthraquinone | yellow |
| 100 | 8-(2,4-dichloro-benzoylamino)-1-(2,3,4,5-tetrachloro-benzoylamino)-anthraquinone | yellow |
| 101 | 8-(2,5-dichloro-benzoylamino)-1-(2,3,4,5-tetrachloro-benzoylamino)-anthraquinone | yellow |
| 102 | 8-(3,4-dichloro-benzoylamino)-1-(2,3,4,5-tetrachloro-benzoylamino)-anthraquinone | yellow |
| 103 | 8-(2,3,4,5-tetrachloro-benzoylamino)-1-(4-nitro-benzoylamino)-anthraquinone | yellow |
| 104 | 8-(2,3,4,5-tetrachloro-benzoylamino)-1-(4-methyl-benzoylamino)-anthraquinone | yellow |
| 105 | 8-(2,3,4,5-tetrachloro-benzoylamino)-1-(3-trifluoromethyl-benzoylamino)-anthraquinone | yellow |
| 105 | 5,8-dichloro-4-benzoylamino-1-(2,3,4,5-tetrachloro-benzoylamino)-anthraquinone | red |
| 106 | 5,8-dichloro-4-(3-chloro-benzoylamino)-1-(2,3,4,5-tetrachloro-benzoylamino)-anthraquinone | red |

| 107 | 5,8-dichloro-4-(4-chloro-benzoylamino)-1-(2,3,4,5-tetrachloro-benzoylamino)-anthraquinone | red |
| 108 | 5,8-dichloro-4-(2,4-dichloro-benzoylamino)-1-(2,3,4,5-tetrachloro-benzoylamino)-anthraquinone | red |
| 109 | 5,8-dichloro-4-(2,3,4,5-tetrachloro-benzoylamino)-1-(4-methyl-benzoylamino)-anthraquinone | red |

EXAMPLES 110 – 168

According to Example 4, with the use of the amount there indicated of 2,3,4,5-tetrachloro-benzoic acid or an equal amount of 2,3,4,6- or 2,3,5,6-tetrachlorobenzoic acid and by replacing the 10.0 parts 4-amino-1-benzoylamino-anthraquinone by equivalent amounts of anthraquinone derivatives with an acylatable amino group, there are obtained the dyestuffs set out in the Table below which, according to the methods described in Examples 1b to 1g, yield fast pigmentations with the shades specified in the following Table.

| Example | Dyestuff | Shade |
| --- | --- | --- |
| 110 | 1-(2,3,4,5-tetrachloro-benzoylamino)-anthraquinone | yellow |
| 111 | 4-methylamino-1-(2,3,4,5-tetrachlorobenzoylamino)-anthraquinone | blue-violet |
| 112 | 4-butylamino-1-(2,3,4,5-tetrachlorobenzoylamino)-anthraquinone | blue-violet |
| 113 | 4-dodecylamino-1-(2,3,4,5-tetrachlorobenzoylamino)-anthraquinone | blue-violet |
| 114 | 4-stearylamino-1-(2,3,4,5-tetrachlorobenzoylamino)-anthraquinone | blue-violet |
| 115 | 4-cyclohexylamino-1-(2,3,4,5-tetrachlorobenzoylamino)-anthraquinone | violet |
| 116 | 4-anilino-1-(2,3,4,5-tetrachloro-benzoylamino)-anthraquinone | blue-violet |
| 117 | 4-(4-chloro-anilino)-1-(2,3,4,5-tetrachloro-benzoylamino)-anthraquinone | blue-violet |
| 118 | 4-(2,4-dichloro-anilino)-1-(2,3,4,5-tetrachloro-benzoylamino)-anthraquinone | blue-violet |
| 119 | 4-(4-methoxy-anilino)-1-(2,3,4,5-tetrachloro-benzoylamino)-anthraquinone | blue |
| 120 | 4-chloro-1-(2,3,4,5-tetrachloro-benzoylamino)-anthraquinone | yellow |
| 121 | 5-chloro-1-(2,3,4,5-tetrachloro-benzoylamino)anthraquinone | yellow |
| 122 | 6-chloro-1-(2,3,5,6-tetrachloro-benzoylamino)-anthraquinone | yellow |
| 123 | 6-fluoro-1-(2,3,4,5-tetrachloro-benzoylamino)-anthraquinone | yellow |
| 124 | 7-fluoro-1-(2,3,4,5-tetrachloro-benzoylamino)-anthraquinone | yellow |
| 125 | 7-chloro-1-(2,3,4,5-tetrachloro-benzoylamino)-anthraquinone | yellow |
| 126 | 5,8-dichloro-1-(2,3,4,5-tetrachloro-benzoylamino)-anthraquinone | yellow |
| 127 | 6,7-dichloro-1-(2,3,4,5-tetrachlorobenzoylamino)-anthraquinone | yellow |
| 127 | 6,7-difluoro-1-(2,3,4,5-tetrachlorobenzoylamino)-anthraquinone | yellow |
| 129 | 4,5,8-trichloro-1-(2,3,4,5-tetrachlorobenzoylamino)-anthraquinone | yellow |
| 130 | 2-bromo-4-(4-methyl-anilino)-1-(2,3,4,5-tetrachloro-benzoylamino)-anthraquinone | blue-violet |
| 131 | 4-nitro-1-(2,3,4,6-tetrachloro-benzoylamino)-anthraquinone | yellow |
| 132 | 5-nitro-1-(2,3,5,6-tetrachloro-benzoylamino)-anthraquinone | yellow |
| 133 | 4-acetylamino-1-(2,3,4,5-tetrachlorobenzoylamino)-anthraquinone | orange |
| 134 | 5-acetylamino-1-(2,3,4,5-tetrachlorobenzoylamino)-anthraquinone | yellow |
| 135 | 5-propionylamino-1-(2,3,4,5-tetrachlorobenzolamino)-anthraquinone | yellow |
| 136 | 6-butyrylamino-1-(2,3,4,5-tetrachlorobenzoylamino)-anthraquinone | yellow |
| 137 | 5-laurylamino-1-(2,3,4,5-tetrachlorobenzoylamino)-anthraquinone | yellow |
| 138 | 5-palmitylamino-1-(2,3,4,5-tetrachlorobenzoylamino)-anthraquinone | yellow |
| 139 | 5-stearoylamino-1-(2,3,4,5-tetrachlorobenzoylamino)-anthraquinone | yellow |
| 140 | 8-benzoylamino-1-(2,3,4,5-tetrachlorobenzoylamino)-anthraquinone | yellow |
| 141 | 8-benzoylamino-1-(2,3,5,6-tetrachlorobenzoylamino)-anthraquinone | yellow |
| 142 | 1,4-dibenzoylamino-5(2,3,4,5-tetrachlorobenzoylamino)-anthraquinone | orange |
| 143 | 4-(2,3,4,5-tetrachloro-benzoylamino)-1-phenyl-acetylamino-anthraquinone | red |
| 144 | 4-(2,3,5,6-tetrachloro-benzoylamino)-1-phenyl-acetylamino-anthraquinone | red |
| 145 | 4-(2,3,4,5-tetrachloro-benzoylamino)-1-(4-nitro-phenylacetylamino)-anthraquinone | red-brown |
| 146 | 4-(2,3,4,5-tetrachloro-benzoylamino)-1-(4-methyl-phenylacetylamino)-anthraquinone | red-brown |
| 147 | 5-(2,3,4,5-tetrachloro-benzoylamino)-1-(4-chloro-phenylacetylamino)-anthraquinone | yellow |
| 148 | 4-(2,3,4,5-tetrachloro-benzoylamino)-1-hydroxy-anthraquinone | orange |
| 149 | 8-nitro-4-(2,3,4,5-tetrachloro-benzoylamino)-1,5-dihydroxy-anthraquinone | red |
| 150 | 5-nitro-4-(2,3,4,5-tetrachloro-benzoylamino)-1,8-dihydroxy-anthraquinone | red |
| 151 | 5-nitro-4-(2,3,5,6-tetrachloro-benzoylamino)-1,8-dihydroxy-anthraquinone | red |
| 152 | 8-(2,3,4,5-tetrachloro-benzoylamino)-1,4,5-trihydroxy-anthraquinone | violet |
| 153 | 4-(2,3,5,6-tetrachloro-benzoylamino)-1-methoxy-anthraquinone | orange |
| 154 | 4-(2,3,5,6-tetrachloro-benzoylamino)-1-isopropoxy-anthraquinone | orange |
| 155 | 4-(2,3,5,6-tetrachloro-benzoylamino)-1-hydroxy-3-phenoxy-anthraquinone | yellow-red |
| 156 | 8-chloro-4-(2,3,4,6-tetrachloro-benzoylamino)-1-hydroxy-anthraquinone | orange |
| 157 | 8-chloro-4-(2,3,4,6-tetrachloro-benzoylamino)-1-methoxy-anthraquinone | orange |
| 158 | 1-(2,3,4,5-tetrachloro-benzoylamino)-2-carboxy-anthraquinone | yellow |
| 159 | 1-(2,3,4,5-tetrachloro-benzoylamino)-2-carbamoyl-anthraquinone | yellow |
| 160 | 1-(2,3,4,5-tetrachloro-benzoylamino)-2-methoxycarbonyl-anthraquinone | yellow |
| 161 | 1-(2,3,4,5-tetrachloro-benzoylamino)-2-propoxycarbonyl-anthraquinone | yellow |
| 162 | 1-(2,3,4,5-tetrachloro-benzoylamino)-2-butoxycarbonyl-anthraquinone | yellow |
| 163 | 1-(2,3,4,5-tetrachloro-benzoylamino)-2-acetyl-anthraquinone | yellow |

| | | |
|---|---|---|
| 164 | 1-(2,3,4,5-tetrachloro-benzoylamino)-6-methyl-mercapto-anthraquinone | yellow |
| 165 | 1-(2,3,4,5-tetrachloro-benzoylamino)-6-phenyl-mercapto-anthraquinone | yellow |
| 166 | 1-(2,3,4,5-tetrachloro-benzoylamino)-6-methyl-sulphonyl-anthraquinone | yellow |
| 167 | 1-(2,3,4,5-tetrachloro-benzoylamino)-6-(4-chloro-phenylsulphonyl)-anthraquinone | yellow |
| 168 | 4-(2,3,5,6-tetrachloro-benzoylamino)-1-(4-methyl-phenylsulphonylamino)3-phenylsulphonyl-anthraquinone. | red |

EXAMPLES 169 – 172

According to Example 9, with the use of the amount there indicated of 2,3,4,5-tetrachloro-benzoic acid or equal amounts of 2,3,4,6- or 2,3,5,6-tetrachloro-benzoic acid and by replacing the 15.1 parts 4-amino-1-(2,3,4,5-tetrachloro-benzoylamino)-anthraquinone by equivalent amounts of the amino-(tetrachloro-benzoylamino)-anthraquinone produced according to Example 5, there are obtained the dyestuffs set out in the Table below, which are identical with the dyestuffs obtained by other methods indicated in the Examples set out in the Table and are similar in respect to their tinctorial and pigment properties.

| Example | Dyestuff | Corresponds to the dyestuff in Example |
|---|---|---|
| 169 | 1,4-di-(2,3,5,6-tetrachloro-benzoylamino)-anthraquinone | 24 |
| 170 | 1,4-di-(2,3,4,6-tetrachloro-benzoylamino)-anthraquinone | 25 |
| 171 | 1,5-di-(2,3,4,5-tetrachloro-benzoylamino)-anthraquinone | 2 |
| 172 | 1,5-di-(2,3,5,6-tetrachloro-benzoylamino)-anthraquinone | 6 |

EXAMPLE 173

According to Example 1(a), but with the use of a mixture of 11.65 parts 2,3,4,5-tetrachloro-benzoylchloride and 13.1 parts pentachloro-benzoylchloride, instead of 23.3 parts 2,3,4,5-tetrachloro-benzoylchloride, a yellow dyestuff is obtained in the form of lemon-yellow prisms which dissolve in concentrated sulphuric acid with a yellow color and which, when used according to Examples 1b to 1l, yield yellow pigmentations with very good fastness properties. The dyestuff consists of a mixture of 1,5-di-(2,3,4,5-tetrachloro-benzoyl amino)-anthraquinone with 5-(2,3,4,5-tetrachloro-benzoylamino)-1-(pentachloro-benzoylamino)-anthraquinone and 1,5-di-(pentachloro-benzoylamino)-anthraquinone in an approximate proportion of 1:2:1.

Dyestuff mixtures of another constitution which yield yellow pigmentations of similar fastness are obtained when a different molar mixing ratio of the altogether two mol acid chloride per mol 1,5-di-amino-anthraquinone is chosen and/or one or both acid chlorides are replaced by equivalent amounts of 2,3,4,6- or 2,3,5,6-tetrachloro-benzoylchloride.

When, instead of 10.0 parts 1,5-diamino-anthraquinone, equivalent amounts of 4,8-diamino-1,5-dihydroxy-anthraquinone and, instead of 11.35 parts 2,3,4,5-tetrachloro-benzoylchloride, equal parts of 2,3,5,6-tetrachloro-benzoylchloride are used, a dyestuff is obtained in the form of red prisms of metallic lustre, which dissolves in sulphuric acid with a brown color and yields, according to Example 1b to 1l, very fast pigmentations. The dyestuff consists of a mixture of 4,8-di-(2,3,5,6-tetrachloro-benzoylamino)-, 8-(2,3,5,6-tetrachloro-benzoylamino)-4-(pentachloro-benzoylamino)- and 4,8-di-(pentachloro-benzoylamino)-1,5-dihydroxy-anthraquinone in an approximate proportion of 1:2:1.

When in Example 1a, instead of 10.0 parts 1,5-diamino-anthraquinone, there is used the equivalent amount of 4,5-diamino-1,8-dihydroxy-anthraquinone and, instead of 23.3 parts 2,3,4,5-tetrachloro-benzoylchloride, a mixture of 15.5 parts 2,3,4,5-tetrachloro-benzoylchloride and 8.75 parts pentachloro-benzoylchloride, a dyestuff is obtained in the form of red-violet needles of metallic lustre, which dissolves in concentrated sulphuric acid with a red-brown color and yields, according to the methods described in Examples 1b to 1l, very fast red pigmentations. The dyestuff consists of a mixture of 4,5-di-(2,3,4,5-tetrachloro-benzoylamino)-, 5-(2,3,4,5-tetrachloro-benzoylamino)-4-(pentachloro-benzoylamino)- and 4,5-di-(pentachloro-benzoylamino)-1,8-dihydroxy-anthraquinone in an approximate proportion of 3.7:3.6:1.

When in Example 1a there is used, instead of 10.0 parts 1,5-diamino-anthraquinone, the equivalent amount of a mixture of equal parts of 4,5-diamino-1,8-dihydroxy- and 4,8-diamino-1,5-dihydroxy-anthraquinone, a dyestuff is obtained in the form of brown needles and red prisms, which dissolves in concentrated sulphuric acid with a brown color and yields, according to Examples 1b to 1l red-brown pigmentations with good fastness properties. The dyestuff consists of a 1:1 mixture of 4,5- or 4,8-di-(2,3,4,5-tetrachloro-benzoylamino)-1,5- or 1,8-dihydroxy-anthraquinone.

EXAMPLES 174 to 184

According to Example 10, with the use of the amount there indicated of 2,3,4,5-tetrachloro-benzoic acid, or equal amounts of 2,3,4,6- or 2,3,5,6-tetrachloro-benzoic acid, or equivalent amounts of pentachloro-benzoic acid, and by using or replacing g15.1 parts 4-amino-1-(pentachloro-benzoylamino)-anthraquinone by equivalent amounts of the amino-(pentachloro- or -tetrachloro-benzoylamino)-anthraquinones produced according to Example 5, there are obtained the dyestuffs set out in the Table below, which yield, according to the methods described in Examples 1b to 1m, fast pigmentations or dyeings with the shades specified in the Table.

| Example | Dyestuff | Shade |
|---|---|---|
| 174 | 4-(2,3,4,5-tetrachloro-benzoylamino)-1-(2,3,5,6-tetrachloro-benzoylamino)-anthraquinone | orange |
| 175 | 4-(2,3,5,6-tetrachloro-benzoylamino)-1-(pentachloro-benzoylamino)-anthraquinone | orange |
| 176 | 4-2,3,4,6-tetrachloro-benzoylamino)-1-pentachloro-benzoylamino)-anthraquinone | orange |
| 177 | 4-(2,3,4,6-tetrachloro-benzoylamino)-1-(2,3,5,6-tetrachloro-benzoylamino)-anthraquinone | orange |
| 178 | 4-(2,3,4,5-tetrachloro-benzoylamino)-1-(2,3,4,6-tetrachloro-benzoylamino)-anthraquinone | orange |
| 179 | 5-(2,3,5,6-tetrachloro-benzoylamino)-1-(pentachloro-benzoylamino)-anthraquinone | yellow |

| 180 | 5-(2,3,4,5-tetrachloro-benzoylamino)-1-(pentachloro-benzoylamino)-anthraquinone | yellow |
| 181 | 5-(2,3,4,5tetrachloro-benzoylamino)1-(2,3,5,6-tetrachloro-benzoylamino)-anthraquinone | yellow |
| 182 | 8-(2,3,5,6-tetrachloro-benzoylamino)-4-(pentachloro-benzoylamino)-1,5-dihydroxy-anthraquinone | red |
| 183 | 8-(2,3,4,5-tetrachloro-benzoylamino)-4-(pentachloro-benzoylamino)-1,5-dihydroxy-anthraquinone | red |
| 184 | 5-(2,3,4,5-tetrachloro-benzoylamino)-4-(pentachloro-benzoylamino)-1,8-dihydroxyanthraquinone. | red |

We claim:
1. Anthraquinone dyestuff of the formula

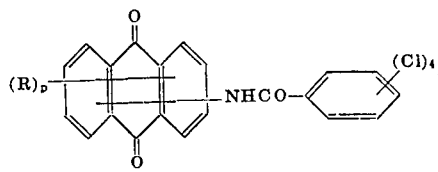

in which R is halogen, nitro; amino; alkylamino with one–18 carbon atoms; cyclohexylamino; anilino; anilino substituted with cloro, methyl or methoxy; alkyl carbonylamino with one–18 carbon atoms; naphthoylamino; benzoylamino; benzoylamino substituted with nitro, hydroxy, methoxy, lower alkyl, trifluoromethyl, phenyl, sulfamoyl, carboxy, carbamoyl, lower alkyl substituted carbamoyl, sulfolanyl phenyl carbamoyl, phenyl carbamoyl, or chlorophenyl carbamoyl; phenylacetylamino; phenylacetylamino substituted with chloro, nitro or methyl; lower alkoxy; phenoxy; methylmercapto; phenylmercapto; methylsulfonyl; phenylsulfonyl; carboxy; lower alkoxycarbonyl; carbamoyl; methyl carbonyl; sulfamoyl; phenyl sulfonylamino; or hydroxy; $p$ is a whole number 0–4.

2. Anthraquinone dyestuff of the formula

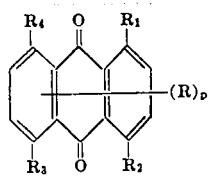

in which one of the radicals $R_1$–$R_4$ is

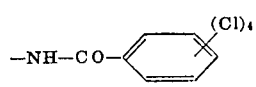

one radical $R_1$–$R_4$ is

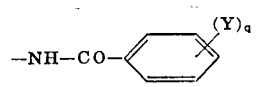

in which Y is halogen; nitro; hydroxy; methoxy; lower alkyl; trifluoromethyl; sulfamoyl; phenyl; carboxy; carbamoyl; lower alkyl carbamoyl; phenylcarbamoyl; or sulfolanyl phenyl carbamoyl;
    q is a number 0-5;
    and two radicals $R_1$–$R_4$ are hydroxy;
    R is halogen; nitro; amino; alkylamino with one–18 carbon atoms; cyclohexylamino; anilino; anilino substituted with chloro, methyl or methoxy; alkyl carbonylamino with one–18 carbon atoms; naphthoylamino; benzoylamino; benzoylamino substituted with halogen, nitro, hydroxy, methoxy, lower alkyl, trifluoromethyl, phenyl, sulfamoyl, carboxy, carbamoyl, lower alkyl substituted carbamoyl, sulfolanyl phenyl carbamoyl, phenyl carbamoyl, or chloro phenyl carbamoyl; phenyl acetylamino; phenyl acetylamino substituted with chloro, nitro or methyl; lower alkoxy; phenoxy; methylmercapto; phenylmercapto; methylsulfonyl; phenylsulfonyl; carboxy; lower alkoxy carbonyl; carbamoyl; methylcarbonyl; sulfamoyl; or phenylsulfonylamino;

$p$ is a whole number 0-4.
3. Anthraquinone dyestuff of claim 2 in which p is 0.
4. Anthraquinone dyestuff of the formula

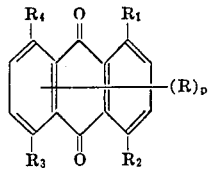

in which $R_1$–$R_4$ are hydrogen; methoxy; amino; alkylamino with one-18 carbon atoms; cyclohexylamino; anilino; anilino substituted with chloro, methyl or methoxy; halogen; nitro; alkylcarbonylamino with one–18 carbon atoms; naphthoylamino; benzoylamino; benzoylamino substituted with halogen, nitro, hydroxy, methoxy, lower alkyl, trifluoromethyl, phenyl, sulfamoyl, carboxy, carbamoyl, lower alkyl substituted carbamoyl, phenyl carbamoyl, chloro phenyl carbamoyl or sulfolanyl phenyl carbamoyl; with the proviso that two of the radicals $R_1$–$R_4$ are

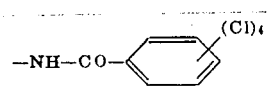

and

R is halogen; nitro; amino; alkylamino with one–18 carbon atoms; cyclohexylamino; anilino; anilino substituted with cloro, methyl or methoxy; alkyl carbonylamino with one–18 carbon atoms; naphthoylamino; benzoylamino; benzoylamino substituted with nitro, hydroxy, methoxy, lower alkyl, trifluoromethyl, phenyl, sulfamoyl, carboxy, carbamoyl, lower alkyl substituted carbamoyl, sulfolanyl phenyl carbamoyl, phenyl carbamoyl, or chlorophenyl carbamoyl; phenylacetylamino; phenylacetylamino substituted with chloro, nitro or methyl; lower alkoxy; phenoxy; methylmercapto; phenyl mercapto; methylsulfonyl; phenylsulfonyl; carboxy; lower alkoxycarbonyl; carbamoyl; methyl carbonyl; sulfamoyl; phenyl sulfonylamino; or hydroxy;

$p$ is a whole number 0-4.
5. Anthraquinone dyestuff of claim 4 in which $p$ is 0; and two of the radicals $R_1$–$R_4$ are hydrogen and the other two are

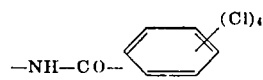

* * * * *

UNITED STATES PATENT OFFICE
CERTIFICATE OF CORRECTION

Patent No. 3,720,693          Dated March 13, 1973

Inventor(s) Karl-Heinz Peters et al

It is certified that error appears in the above-identified patent and that said Letters Patent are hereby corrected as shown below:

Column 3, line 67, "5-amino-1- (-n-" should read ---5-amino-1-(4-n- ---.

Column 6, line 51, "4,8-di-(2,3,4,51,5-" should read ---4,8-di-(2,3,4,5-tetrachloro-benzoylamino)-1,5- ---.

Column 7, line 62, "anhraquinone" should read ---anthraquinone ---.

Column 15, line 5, "diaminoganthraquinones" should read ---diaminoanthraquinones---.

Column 16, Example 33, "5,8-dic loro-1, 4-di-(2,3,5,6-tetra-chlorbenzoyl-amino)-nthraquinone" should read ---5,8-dichloro-1,4-di-(2,3,5,6-tetrachloro-benzoylamino)-anthraquinone---and should fall under the correct column.

Column 16, line 43, "-anthraquinoes" should read --anthraquinones--.

Column 17, line 1, "(4-(4-" should read --- 4-(4- ---.

Column 19, Example 109 "-benzoylamino-1-" should read --- -benzoylamino)-1- ---.

Column 22, line 43, delete the "g" at the beginning of the line

Column 22, Example 176, "4-2,3,4,6-" should read --- 4-(2,3,4,6- ---.

Column 22, Example 176, "-1-pentachloro-" should read --- -1-(pentachloro- ---.

Signed and sealed this 26th day of November 1974.

(SEAL)
Attest:

McCOY M. GIBSON JR.
Attesting Officer

C. MARSHALL DANN
Commissioner of Patents